March 26, 1963 R. E. JOHNSON ETAL 3,082,461
WINDSHIELD WIPER MECHANISM
Filed March 21, 1960
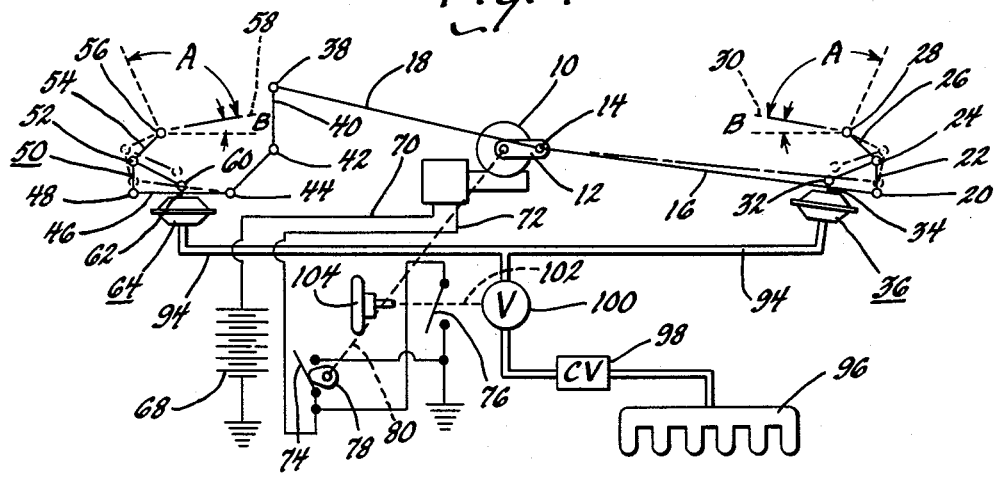
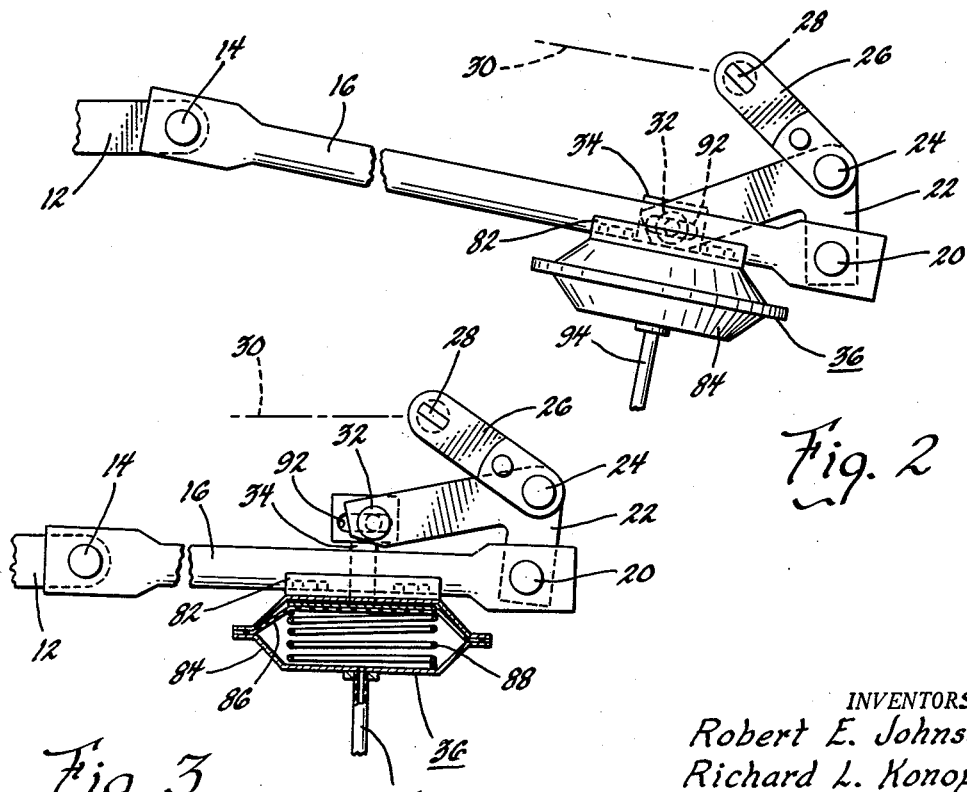
INVENTORS
Robert E. Johnson
Richard L. Konopa
BY *W. E. Finken*
THEIR ATTORNEY

United States Patent Office 3,082,461
Patented Mar. 26, 1963

3,082,461
WINDSHIELD WIPER MECHANISM
Robert E. Johnson and Richard L. Konopa, Anderson, Ind., assignors to General Motors Corporation, Detroit, Mich., a corporation of Delaware
Filed Mar. 21, 1960, Ser. No. 16,536
6 Claims. (Cl. 15—250.17)

This invention pertains to windshield cleaning mechanism, and particularly to auxiliary parking means for an electric motor driven windshield wiper.

At the present time there are two types of electric motor driven windshield wipers in use. In one type of mechanism the wiper blades are driven throughout a running stroke, and when the manual control is moved to the "off" position the wiper blades are automatically moved to a depressed parked position beyond the inboard stroke end limit of the running stroke and into engagement with the lower reveal molding of the windshield. In the second type the wiper blades are likewise driven through a running stroke, but when the manual wiper control is moved to the "off" position, movement of the wiper blades is arrested at the inboard stroke end limit. Obviously, the depressed parking type of wiper mechanism is superior to the nondepressed parking type of mechanism since the wiper blades are moved out of the range of the driver's vision when they are not in operation. However, since the depressed parking type of mechanism must embody either a variable throw crank or an adjustable length linkage to move the wiper blades to their depressed parked positions, the cost of the depressed parking type mechanism is appreciably greater than the cost of the nondepressed parking type of mechanism. The present invention relates to inexpensive auxiliary means for converting a nondepressed parking type mechanism to a depressed parking type of mechanism.

Accordingly, among our objects are the provision of electric motor driven windshield wiper actuating mechanism including auxiliary means for obtaining depressed parking of each wiper blade; the further provision of windshield wiper actuating mechanism of the type including a rotary crank and linkage between the crank and the wiper blade together with auxiliary means for varying the effective length of the linkage; and the still further provision of a variable length linkage for actuating a windshield wiper and vacuum motor means for controlling the effective length of the linkage.

The aforementioned and other objects are accomplished in the present invention by using a diaphragm-type vacuum motor having a return spring together with a vacuum control valve which is actuated concurrently with the manual wiper control. Specifically, the electric motor driven wiper mechanism may comprise a unidirectional electric motor for driving a rotary crank. The energizing circuit for the motor includes a manual wiper control switch and a cyclically actuated parking switch connected in parallel therewith whereby upon movement of the manual wiper control switch to the "off" position, the wiper motor will be deenergized at a predetermined angular position of the wiper blades, namely their running inboard stroke ends.

The rotary crank is connected to the inner end of a connecting link, the outer end of which is connected through a bellcrank to the drive arm of a pivot shaft to which the wiper arm and blade assembly is connected. The bellcrank controls the effective length of the linkage drive and thus controls the stroke of the wiper blade. One end of the bellcrank is pivotally connected to the other end of the connecting link; the intermediate portion of the bellcrank is connected through a ball and socket joint to the free end of the drive arm; and the other end of the bellcrank is pivotally connected to a member positioned by the vacuum motor.

The vacuum motor is of the diaphragm type including a return spring. The housing of the diaphragm motor is rigidly attached to the connecting link and the bellcrank is pivotally connected to the projecting stem of the diaphragm. During running operation of the wipers, vacuum is applied to the diaphragm motors, one diaphragm motor being used for each wiper blade. Accordingly, the effective length of the linkage drive remains constant during running operation of the wipers. When the manual wiper control is moved to the "off" position, the vacuum to the motors is interrupted, thereby permitting the springs to extend the diaphragm stems and pivot the bellcranks to increase the effective length of the linkages so as to move the wiper blades from their inboard stroke end running positions to depressed parked positions whereat they firmly engage the lower reveal molding of the windshield.

Further objects and advantages of the present invention will be apparent from the following description, reference being had to the accompanying drawings, wherein a preferred embodiment of the present invention is clearly shown.

In the drawings:

FIGURE 1 is a schematic view of the improved windshield wiper actuating mechanism and control system therefor.

FIGURE 2 is a fragmentary view, in elevation, of the drive linkage for one wiper blade in the running position.

FIGURE 3 is a view, partly in section and partly in elevation, of the drive linkage for one wiper blade in the parked position.

With particular reference to FIGURE 1, the improved windshield wiper actuating mechanism comprises a unidirectional electric motor 10 which rotates a crank 12 through a suitable gear reduction, not shown. In the disclosed embodiment, the crank 12 has a single crank pin 14 to which the inner ends of connecting links 16 and 18 are movably connected. Accordingly, during rotation of the crank 12, to and fro motion will be imparted to the links 16 and 18. The outer end of the link 16 is pivotally connected at 20 to one end of a bellcrank 22 having an intermediate pivot 24 in the form of a ball and socket joint to a drive arm 26. The drive arm 26 is drivingly connected to a pivot shaft 28 to which a wiper arm and blade assembly depicted schematically by numeral 30, is attached. The other end of the bellcrank 22 is pivotally connected at 32 to the stem 34 of a diaphragm type vacuum motor 36 carried by the link 16.

The outer end of the drive link 18 is pivotally connected at 38 to one end of a reversing link 40 having an intermediate pivot 42 carried by a stationary part of the vehicle, not shown. The other end of the bellcrank 42 is pivotally connected at 44 to one end of a connecting link 46, the other end of which is pivotally connected at 48 to one end of a bellcrank 50. The intermediate portion of the bellcrank is connected through a ball and socket joint 52 to a drive arm 54. The drive arm 54 is connected to pivot pin 56 for actuating an arm and blade assembly 58. The other end of the bellcrank 50 is movably connected at 60 to a stem 62 of the vacuum motor 64. The reversing link 40 changes the direction of motion of the link 18 so that the wiper blade and arm assemblies 58 and 30 will be oscillated asymmetrically across the outer surface of a windshield during rotation of the crank 12. This linkage including the reversing link 40 and the connecting arm 46 is only exemplary, however, as it will be readily apparent that the auxiliary parking means of the present invention can be used with any type of linkage drive, for instance where the motor 10 rotates a double ended crank assembly rather than the single ended crank assembly specifically disclosed.

The energizing circuit for the electric motor 10 comprises a battery 68, one terminal of which is connected to ground and the other terminal of which is connected to one terminal of the motor by a wire 70. The other motor terminal is connected by wire 72 to a cyclically actuated parking switch 74 and a manual wiper control switch 76. The switches 74 and 76 are connected in parallel so that when either of the switches is closed, the motor 10 will be energized. As schematically shown in FIGURE 1, the cyclically actuated parking switch 74 is automatically operated by a cam 78 driven by the motor 10 through linkage 80. The cam 78 is arranged to open the switch 74 during each revolution of the crank 12 when the wiper blades are at a predetermined angular position, namely their running inboard stroke ends.

During rotation of the motor 10 and the crank 12, the wiper blades 30 and 58 are driven throughout their running strokes indicated by the angles A between predetermined inboard and outboard stroke end limits. When the manual wiper control switch 76 is moved to the "off" position, energization of the motor 10 is controlled by the parking switch 74. When the wiper blades and arms 30 and 58 arrive at their inboard stroke end positions, the cam 78 will open the switch 74 to deenergize the motor 10. In a conventional nondepressed parking type mechanism the wiper blades remain at substantially their inboard stroke end positions when the wipers are not in use. However, according to the present invention this type of mechanism can be converted to a depressed parking mechanism wherein the wiper blade and arm assemblies 30 and 58 are moved throughout an angle B to depressed parked positions whereat they firmly engage the lower reveal molding of the windshield and are outside of the driver's range of vision.

With particular reference to FIGURES 2 and 3, wherein the drive linkage for the wiper blade and arm assembly 30 is structurally disclosed, the link 16 has a bracket 82 welded thereto. The vacuum motor 36 includes a housing 84 which is bolted to the bracket 82 so that the entire motor 36 is connected for movement with the link 16. The motor 36 includes a diaphragm 86 and a return spring 88. The diaphragm is connected to the reciprocable stem 34 which projects outside of the housing 84. The stem 34 is formed with a laterally elongated slot 92 which receives a bushing and pivot pin assembly 32 by which means the one end of the bellcrank 22 is connected to the stem 34 of the vacuum motor 36.

The vacuum motor 36 controls the effective length of the linkage between the crank pin 14 and the drive arm 26. During energization of the electric motor 10 through the manual switch 76, vacuum is applied to the motor 36 through flexible conduit 94 from the intake manifold 96 of the vehicle engine. A check valve 98 and a manual vacuum control valve 100 are connected in the conduit 94. The valve 100 is actuated through a linkage 102 for operating the switch 76 by an instrument panel knob 104 such that the valve 100 is opened when the switch 76 is closed, and the valve 100 is closed to the vacuum and the line 94 relieved of vacuum when the switch 76 is open. The check valve 98 functions to maintain the requisite subatmospheric pressure in the vacuum motors 36 and 64 during engine acceleration. That is, when the pressure in the intake manifold approaches atmospheric, the check valve 98 automatically closes.

When vacuum is applied to the motor 36 through conduit 94, the diaphragm 86 is held against the lower wall of the housing thereby compressing the spring 88 and maintaining the bellcrank 22 in the position of FIGURE 2. Accordingly, during rotation of the crank 12, the wiper blade and arm assembly 30 will be oscillated throughout running stroke A through the drive link 16, the bellcrank 22 and the drive arm 26. On the other hand, when the knob 104 is moved to the "off" position, the switch 76 is opened and the valve 100 is closed. When the valve 100 is closed, and the line 94 relieved of vacuum, the spring 88 moves the diaphragm 86 to the position of FIGURE 3 thereby extending the stem 34 and shift the bellcrank 22 about the pivot pin 20. This imparts movement to the drive arm 26 and effectively increases the length of the linkage so as to shift the path of movement of the wiper blade and arm assembly 30 adjacent the inboard stroke end position and move the wiper blade and arm assembly 30 through an angle B, which may be on the order of 15°, to a depressed parked position whereat the wiper blade will firmly engage the lower reveal molding of the windshield. The wiper motor 10 will be automatically deenergized with the wiper blades in the depressed parked position since cam 78 will open the parking switch 74 when the crank 12 is in the position depicted in FIGURE 1.

The vacuum motor 64 is attached in a similar manner as the vacuum motor 36, to the connecting arm 46 rather than the link 18. However, the vacuum motor 64 performs a function identical to that of the vacuum motor 36 in varying the length of the linkage for actuating the wiper blade and arm assembly 58. Thus, in the present invention, each wiper blade is parked by a separate vacuum motor. This arrangement assures that each blade will be moved into firm engagement with the lower reveal molding independent of the companion blade.

While the embodiment of the invention as herein disclosed constitutes a preferred form, it is to be understood that other forms might be adopted.

What is claimed is as follows:

1. Windshield wiper actuating mechanism including, a rotary crank, a pivot shaft, a wiper arm and blade assembly driven by said pivot shaft, linkage means operatively interconnecting said rotary crank and pivot shaft whereby during rotation of said crank oscillation will be imparted to said wiper blade and arm assembly, and pressure differential actuated means for varying the length of said linkage means to shift the path of movement of said wiper blade and arm assembly so as to move said wiper blade and arm assembly to a depressed parked position when rotation of said crank is arrested.

2. Windshield wiper actuating mechanism including, a rotary electric motor, an energizing circuit for said motor including a manually operable switch having "on" and "off" positions and a cyclically actuated parking switch connected in parallel with said manually operable switch, a crank driven by said motor, a pivot shaft, a wiper blade and arm assembly driven by said pivot shaft, a linkage between said crank and said pivot shaft for oscillating said wiper blade and arm assembly throughout a running stroke having inboard and outboard stroke end limits, a vacuum motor carried by said linkage for varying the effective length thereof so as to shift the path of movement of said wiper blade and arm assembly comprising a closed chamber having one wall thereof formed by a diaphragm with an outwardly extending stem secured thereto and a connection between said chamber and a vacuum source, said diaphragm and stem being urged in one direction when vacuum is applied thereto and in the other direction by a spring when vacuum is not applied, the movement of the diaphragm and the stem by the spring causing an increase in the effective length of said linkage, and control means for said vacuum motor comprising a control for the vacuum connection to said chamber which is actuated concurrently with movement of said manually operable switch to the "off" position whereby said wiper blade and arm assembly will be moved beyond the inboard stroke end limit to a depressed parked position whereat it will be arrested upon deenergization of said motor by said parking switch.

3. The windshield wiper actuating mechanism set forth in claim 2 wherein said linkage includes a member operatively connected at one end to said crank, a bellcrank pivotally connected to the other end of said member, a drive arm pivotally connected to the intermediate portion of said bellcrank, and wherein the other end of said bellcrank is pivotally connected to the stem of said vacuum motor whereby movement of said diaphragm controls the effective length of said linkage.

4. Windshield wiper actuating mechanism including, a rotary crank, a pivot shaft, a wiper arm and blade assembly driven by said pivot shaft, linkage means operatively interconnecting said rotary crank and said pivot shaft whereby rotation of said crank will impart oscillation to said wiper blade and arm assembly, said linkage means comprising a member operatively connected at one end to said crank, a bellcrank pivotally connected to the other end of said member, a drive arm having one end attached to said pivot shaft and its other end pivotally connected to the intermediate portion of said bellcrank, and means carried by said member and operatively connected with the other end of said bellcrank for pivoting said bellcrank relative to said member to shift the path of movement of said wiper blade and arm assembly so as to move said wiper blade and arm assembly to a depressed parked position when rotation of said crank is arrested.

5. Windshield wiper actuating mechanism including, a rotary crank, a pair of spaced pivot shafts, a wiper blade and arm assembly driven by each pivot shaft, a linkage operatively connecting each pivot shaft with said rotary crank whereby rotation of said crank will impart oscillation to each wiper blade and arm assembly, and a pressure differential actuated motor for varying the effective length of each linkage to shift the path of movement of each wiper blade and arm assembly and move each wiper blade and arm assembly to a depressed parked position when rotation of said crank is arrested.

6. Windshield wiper actuating mechanism including, a rotary crank, a pivot shaft, a wiper arm and blade assembly driven by said pivot shaft, linkage means operatively interconnecting said rotary crank and said pivot shaft whereby rotation of said crank will impart oscillation to said wiper blade and arm assembly, said linkage means comprising a member operatively connected at one end to said crank, a bellcrank pivotally connected to the other end of said member, a drive arm having one end attached to said pivot shaft and its other end pivotally connected to the intermediate portion of said bellcrank, and a pressure differential actuated motor carried by said member and operatively connected with the other end of said bellcrank for pivoting said bellcrank relative to said member to shift the path of movement of said wiper blade and arm assembly so as to move said wiper blade and arm assembly to a depressed parked position when rotation of said crank is arrested.

References Cited in the file of this patent

UNITED STATES PATENTS

| | | |
|---|---|---|
| 2,012,804 | Bean | Aug. 27, 1935 |
| 2,137,628 | Sayre | Nov. 22, 1938 |
| 2,748,612 | Dyer et al. | June 5, 1956 |
| 2,960,881 | Perry et al. | Nov. 22, 1960 |
| 2,971,388 | Koppel | Feb. 14, 1961 |
| 3,006,013 | Kato | Oct. 31, 1961 |

FOREIGN PATENTS

| | | |
|---|---|---|
| 884,748 | Germany | July 30, 1953 |